US012652272B2

(12) United States Patent　　　　(10) Patent No.:　US 12,652,272 B2
Walsh et al.　　　　　　　　　　(45) Date of Patent:　　　Jun. 9, 2026

(54) SYSTEMS, DEVICES, AND/OR METHODS FOR MANAGING CRYPTOGRAPHY VIA EMPLOYING DUAL INDEPENDENT RANDOM CODING BETWEEN SENDER AND RECEIVER

(71) Applicants:William J. Walsh, Roanoke, VA (US); William K. Walsh, Hardy, VA (US)

(72) Inventors: William J. Walsh, Roanoke, VA (US); William K. Walsh, Hardy, VA (US)

(*) Notice: Subject to any disclaimer, the term of this patent is extended or adjusted under 35 U.S.C. 154(b) by 0 days.

(21) Appl. No.: 18/201,221

(22) Filed: May 24, 2023

(65) Prior Publication Data

US 2025/0227093 A1　　Jul. 10, 2025

(51) Int. Cl.
*H04L 9/40*　　　　(2022.01)
(52) U.S. Cl.
CPC .................................. *H04L 63/0428* (2013.01)
(58) Field of Classification Search
CPC ...................................................... H04L 63/0428
USPC .......................................................... 713/168
See application file for complete search history.

(56) References Cited

U.S. PATENT DOCUMENTS

| | | | | |
|---|---|---|---|---|
| 8,046,841 B2 * | 10/2011 | Moskowitz | ........... | G10L 19/018 |
| | | | | 380/231 |
| 8,631,491 B2 * | 1/2014 | Premnath | .............. | G06F 21/606 |
| | | | | 726/22 |
| 8,667,288 B2 * | 3/2014 | Yavuz | ................... | H04L 9/3247 |
| | | | | 713/176 |
| 8,687,810 B2 * | 4/2014 | Bukshpun | ............. | H04L 9/0838 |
| | | | | 380/278 |
| 8,788,817 B1 * | 7/2014 | Juels | ........................ | G06F 21/55 |
| | | | | 713/168 |
| 10,505,719 B2 * | 12/2019 | Hu | ......................... | H04L 63/123 |
| 11,323,247 B2 * | 5/2022 | Kuang | .................... | H04L 9/065 |
| 11,477,017 B2 * | 10/2022 | Newton | ................ | H04L 9/0869 |
| 2006/0182124 A1 * | 8/2006 | Cole | ..................... | H04L 63/061 |
| | | | | 370/395.54 |
| 2007/0280474 A1 * | 12/2007 | Heinz | ................... | H04L 9/0833 |
| | | | | 380/28 |
| 2011/0083015 A1 * | 4/2011 | Meier | ................... | H04L 9/3247 |
| | | | | 713/176 |

* cited by examiner

*Primary Examiner* — Amare F Tabor
(74) *Attorney, Agent, or Firm* — Rhodes IP PLC; Christopher R Rhodes

(57)　　　　　　ABSTRACT
Certain exemplary embodiments provide an unbreakable encryption system and method through the use of dual, independent random coding between sender and receiver and a three-step transmission process. Said system also incorporating within the encryption method the addresses of both sender and receiver such that they are undiscoverable by an unintended party.

9 Claims, 7 Drawing Sheets

SYSTEMS, DEVICES, AND/OR METHODS FOR MANAGING CRYPTOGRAPHY VIA EMPLOYING DUAL INDEPENDENT RANDOM CODING BETWEEN SENDER AND RECEIVER

BACKGROUND

The need to keep secret messages from unauthorized persons has been known for thousands of years. This need was seen by governments and military personnel. There have been many methods employed for this purpose:

the use of a trusted "runner" to carry un-encrypted message between sender and receiver;

the use of simple "monoalphabetic" or "polyalphabetic" substitution ciphers between sender and receiver, and the use of an agreed time-varying coding technique between sender and receiver by means of shared code-books (for example, the "ENIGMA" machine employed by the German military in World War II); etc.

Each of these methods was subject to failure as a result of capture of the runner, codebooks, or coding machines. Diligent crypto analysts using ingenuity, cipher frequency analysis, pattern searches of frequently used words (e.g. "the", "and", "money", and/or "troops", etc.) were on occasion successful in breaking a code. More recently, the use of computers has also aided in code breaking.

In the 1970's a major advance in cybersecurity took place with the introduction of public and private key cryptography. The technique employs the use of two very large, shared numbers whose product results in a number that is prime. This results in a pair of "one-way functions" that are relatively easy to create but extremely difficult to decompose. The method, is believed to be "practically unbreakable" with current computer technology and mathematical methods. Nevertheless, successful implementation involves considerable complexity, and the pre-distribution of "private keys" to intended users of the system.

Modern communication technologies beginning with the telegraph, radio transmissions, and the Internet have greatly increased the need for secure communications, due to the relative ease of interception. This has been compounded by the rapid and ubiquitous implementation of personal, legal and business e-mails and financial transactions via the Internet.

More recently, both "hackers", intent on widespread mischief or the use of ransomware, and hostile-state terrorists have found that utilities such as water treatment plants, electrical grids, and rail networks are vulnerable. The same is true of facilities such as chemical plants and food processing operations. These vulnerabilities are of concern due to:

An attack can cause widespread economic damage and possibly be life-threatening to served populations.

These operations are spread out over very large areas and can be attacked at many points.

Because of their interactive complexity an attack at one point can result in a cascading of failures throughout the system.

Damaged equipment is expensive, often custom designed, and their replacement sometimes requires long lead times.

Many utility operations were built fifty or more years ago with scant attention to the possibility of sophisticated security attacks via computer controls. Moreover, budget constraints make major system overhauls challenging.

BRIEF DESCRIPTION OF THE DRAWINGS

A wide variety of potential practical and useful embodiments will be more readily understood through the following detailed description of certain exemplary embodiments, with reference to the accompanying exemplary drawings in which.

DETAILED DESCRIPTION

Certain exemplary embodiments provide an unbreakable encryption system and method through the use of dual, independent random coding between sender and receiver and a three-step transmission process. Said system also incorporating within the encryption method the addresses of both sender and receiver such that they are undiscoverable by an unintended party.

Certain exemplary embodiments have the following characteristics:

A code that is substantially unbreakable by any known crypto-analytic technique including the use of "super-computer" methods with unlimited time constraints.

The encryption process that is character dynamic. That is the encryption code continually changes between one encoded character and another. The same plain-text message will show a totally different encryption when immediately repeated.

The identities of the sender and receiver are substantially undiscoverable by any intercepting party.

The coding system can be securely transmitted by radio transmission, or over the Internet. An intercepting party will receive only substantially non-decodable "gibberish."

An intercepting party who knows fully how the encryption method works will not be able to de-code a message between a legitimate sender and a legitimate receiver.

There is no need for a "middle-man" server to authenticate the identities of the sender and receiver.

The coding system is simple to implement via an information device.

Capture of a plain-text message along with the associated code is of no use in de-coding subsequent messages.

There is an assured, real-time linkage between sender and the intended receiver during message transmission.

Certain exemplary embodiments provide an encryption method that substantially meets the aforementioned characteristics. For ease of understanding, the method is described in terms of a command module that controls a series of actuator modules that take place in processing plants such as water treatment, electrical power generation, or chemical conversion. In no way is this intended to limit broad applicability for other applications in the general field of secure message or command control transmission regardless of whether the transmission means is by hard wire, internet or electro-magnetic wave propagation.

Figure 1:
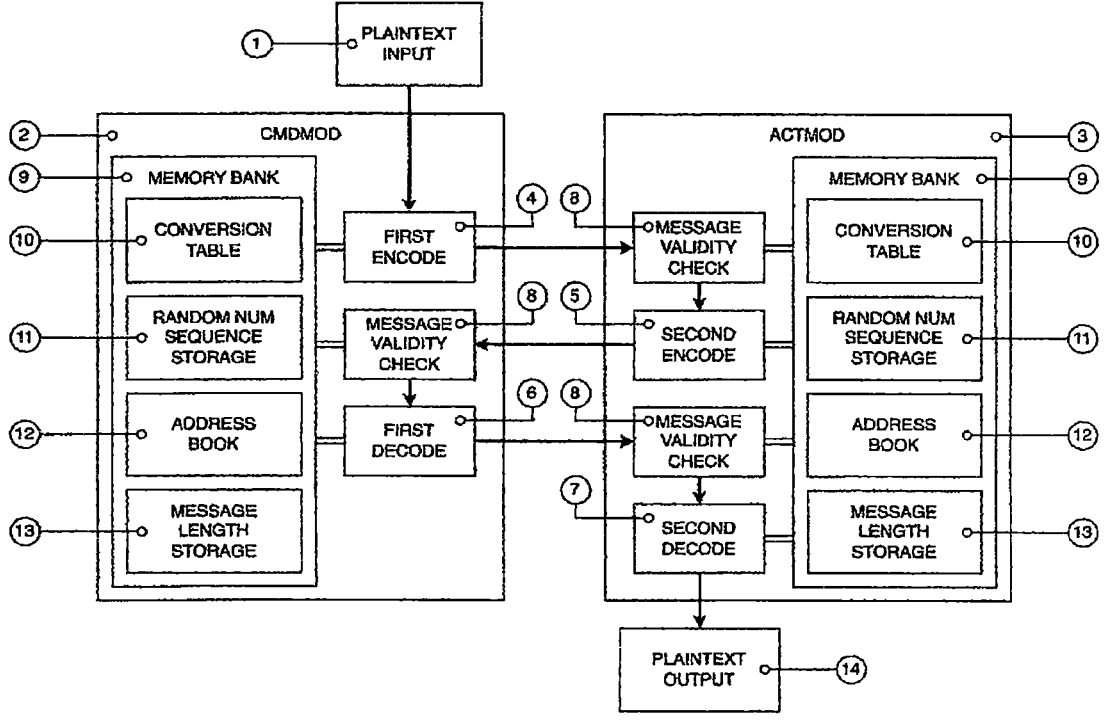
FIG. 1 is a block diagram of a system 1000, which shows an overview of a command module ("COMMOD") controlling an actuator module ("ACTMOD")

FIG. 1 is a block diagram of a system 1000, which links a command module 2 and an actuator module 3. It is to be understood that in practice a plurality of copies of actuator module 3 can be under the control of command module 2.

Command module 2 is constructed to encode a plain text message 1, wherein each character of the plain text message 1 is first encoded utilizing a sum of a digitally pre-stored plain text index code and a first independently randomly generated number to form a coded message. The first independently randomly generated number can be stored via command module 2. The digitally pre-stored plain text index code can be shared between a sender and a receiver. The coded message is first transmitted by the sender to the receiver. Actuator module 3 is constructed to be utilized by the receiver to recode the coded message, character by character, utilizing a second independently generated number to form a recoded message. The second independently generated number stored via the actuator module. The receiver transmits the recoded message back to the sender. The sender partially decodes the recoded message via digitally subtracting out the first independently randomly generated number to form a partially decoded message. The partially decoded message is transmitted back to the receiver. The partially decoded message undergoes final decoding by the receiver by digitally subtracting out, character by character, the second independently generated number to reveal the plain text message.

In certain exemplary embodiments, the system does not utilize any shared codebook or pre-arranged de-coding algorithm.

In certain exemplary embodiments, the system does not distribute a private key.

In certain exemplary embodiments, an address of the receiver is a cyclically varying address. The cyclically varying address further added to the plain text message and associated randomly generated number, character by character, by the sender before transmitting the coded message to the intended receiver.

The receiver further adds the cyclically varying address of the sender in forming the recoded message before transmitting the recoded message back to the sender. The sender can perform a partial decode by removing the cyclically varying address of the sender along with the first independently randomly generated number and transmits the partially decoded message back to the receiver. The receiver reveals the plain text message by removing, character by character, from the partially decoded message the cyclically varying address of the receiver and the second independently generated number.

Certain exemplary embodiments provide a validation checker. The validation checker is constructed to:

receive an alert concerning an incoming message, responsive to the alert, the validation checker constructed to test an address of the sender of the incoming message for validity;

test a length of the received message for validity; and transmit an alarm in event of a detection of an invalid message.

In both command module 2 and actuator module 3:

a random number generator, the random number generator constructed to provide independently generated numbers, wherein the random number generator constructed to generate continually varying random numbers;

a first memory device, the first memory device constructed to store valid encrypted addresses of the sender and the receiver and other sending and receiving information devices admitted to a network, the sender and receiver communicatively coupled via the network;

a second memory device, the second memory device constructed to store a common numerical index for each allowed plain-text character;

a third memory device, the third memory device constructed to store the first independently generated number and the second independently generated number;

a fourth memory device, the fourth memory device constructed to store coded message lengths;

a digital summer, the digital summer to form a binary coded decimal result of adding or subtracting to a plain character index, a random number and a cyclical address of the receiver, character by character;

a validation checker, the validation checker is constructed to:

receive an alert concerning an incoming message, responsive to the alert, the validation checker constructed to test an address of the sender of the incoming message for validity;

test a length of the incoming message for validity; and transmit an alarm in event of a detection of an invalid message.

Certain exemplary embodiments provide a message header and alert processor. The message header and alert processor is constructed to determine an unencoded m of addresses of the sender and the receiver. The receiver can detect an address of the sender and tests for validity before responding.

An address of the sender and an address of the receiver can be integral but obscured part of each character of the coded message. The coded message can be decodable only by the receiver.

In certain exemplary embodiments, the receiver utilizes a requested signature or identity code using an application that is pre-transmitted and stored on an information device.

Figure 2:
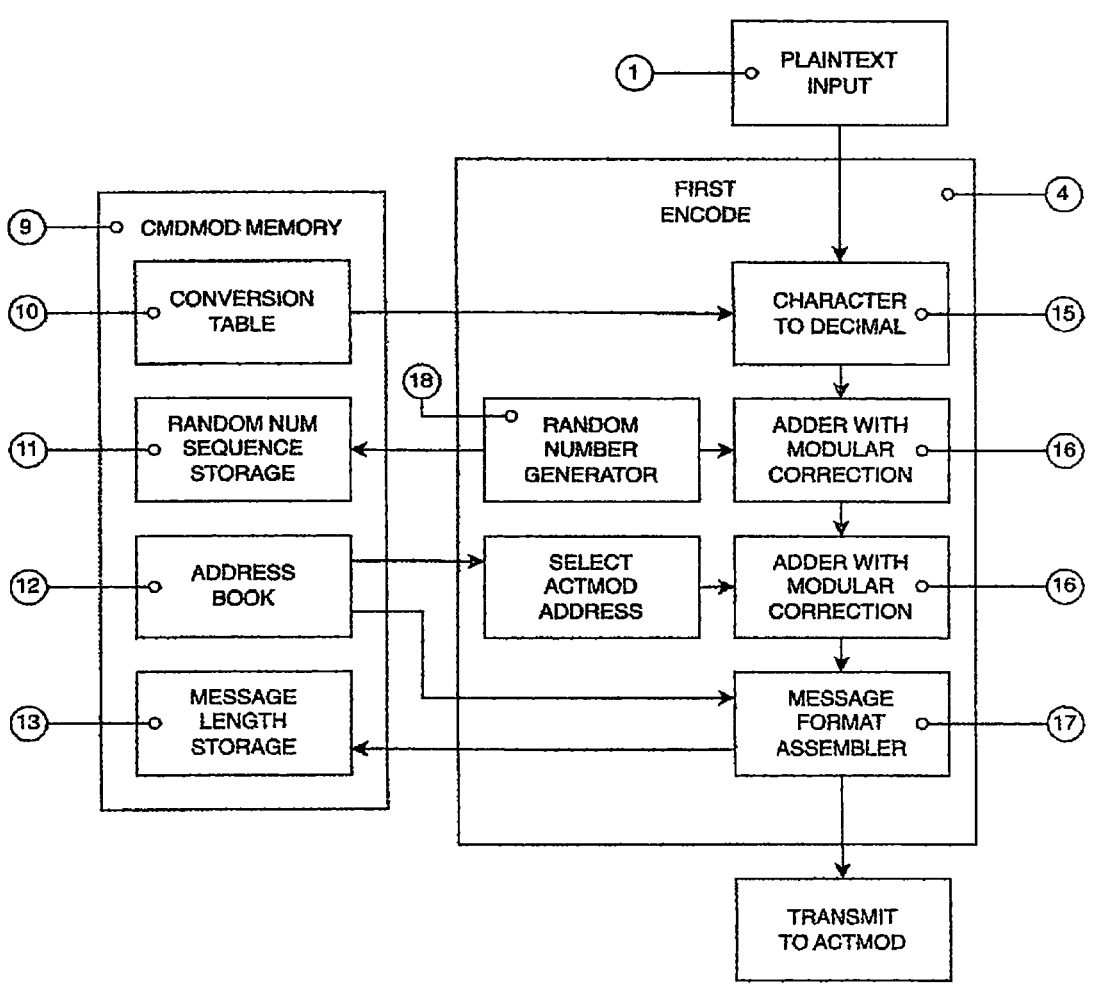
FIG. 2 is a block diagram of a system 2000 via which a first random encode of a COMMOD to an ACTMOD takes place.

FIG. 2 is a block diagram of a system 2000, which illustrates logic employed during an initial plain text random encode by a sending command module.

Figure 3:
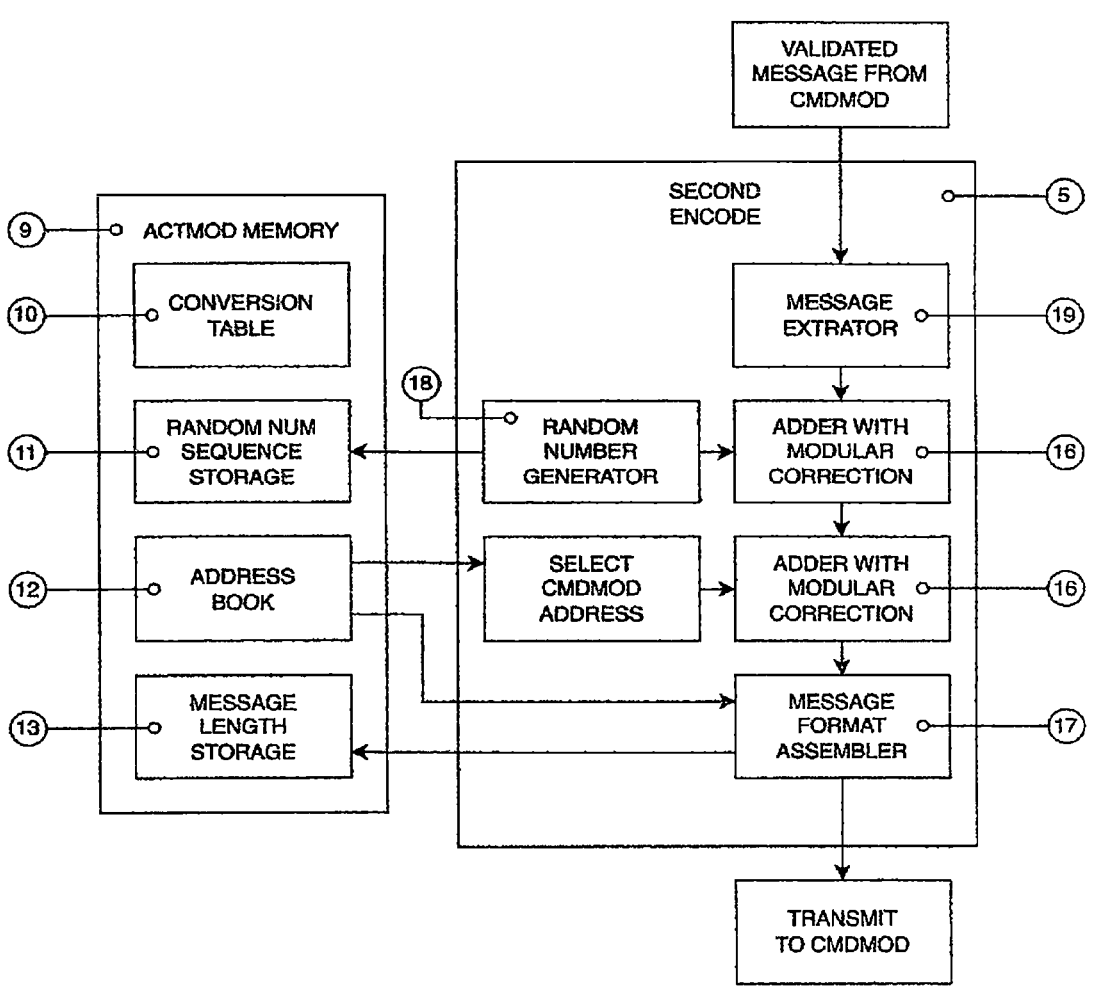
FIG. 3 is a block diagram of a system 3000 via which a second recode by an ACTMOD takes place before transmitting back to a COMMOD.

FIG. 3 is a block diagram of a system 3000, which illustrates logic employed during a second independent random recode by a receiving actuator module.

Figure 4:
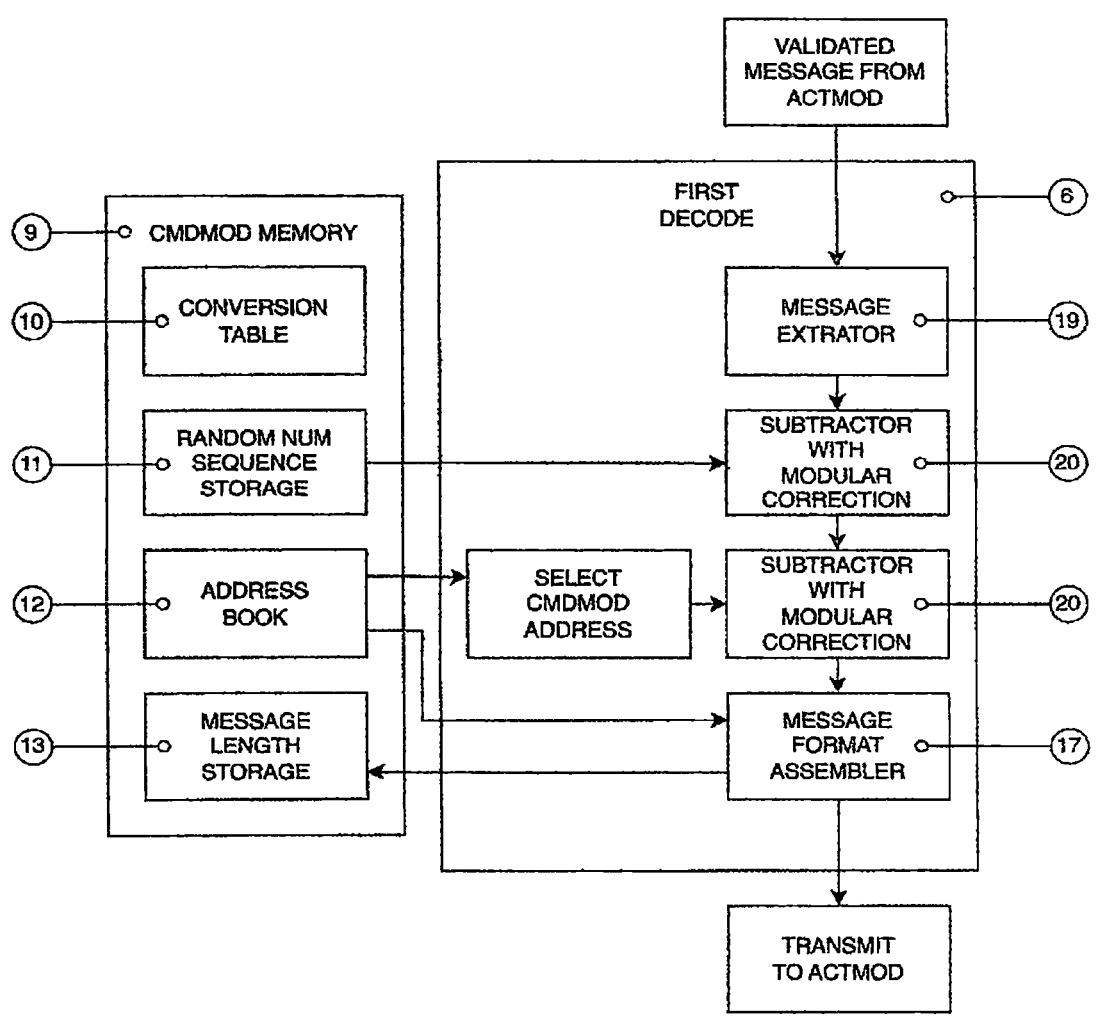
FIG. 4 is a block diagram of a system 4000 via which a first partial decode by the COMMOD takes place before transmitting back to the ACTMOD.

FIG. 4 is a block diagram of a system 4000, which illustrates logic employed during a first partial de-code by the command module.

Figure 5:
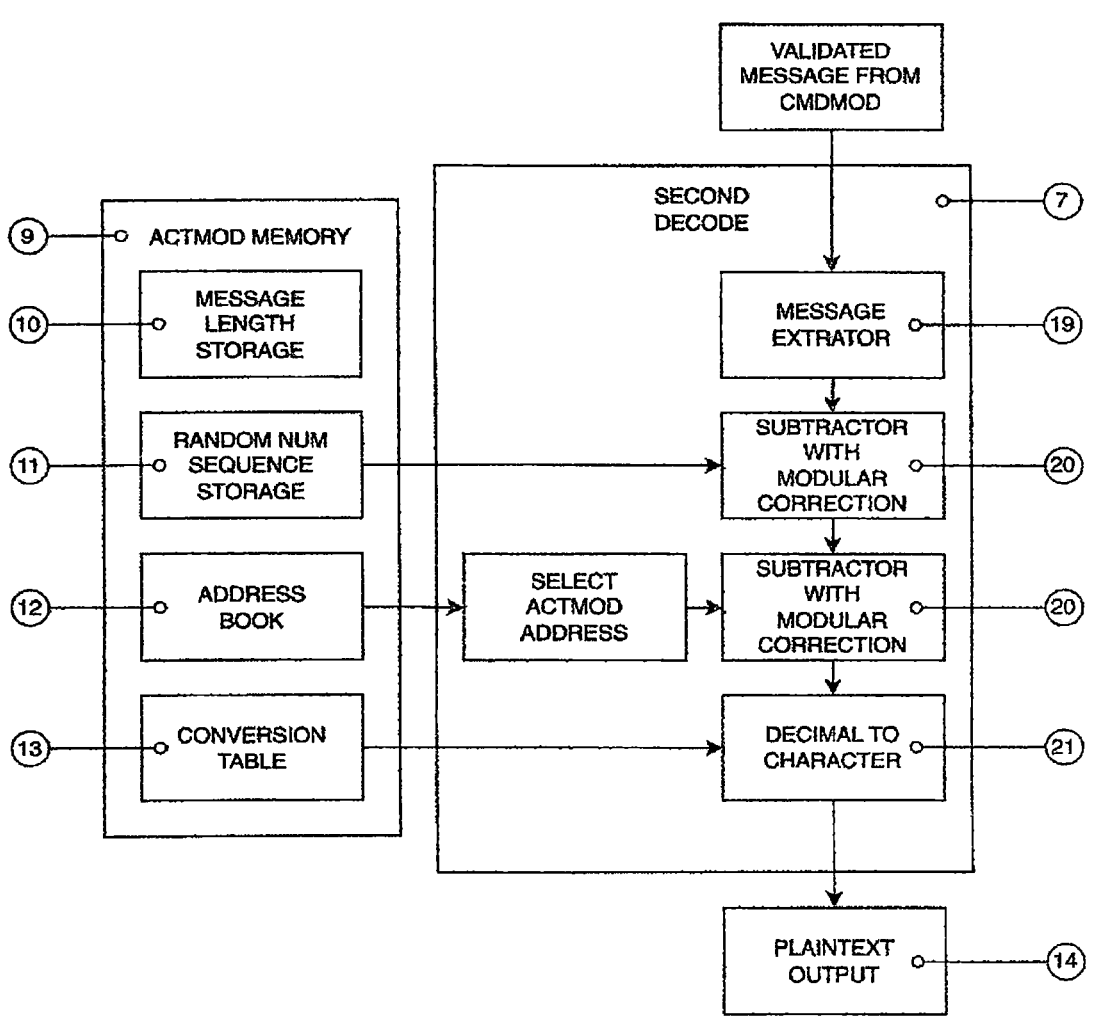
FIG. 5 is a block diagram of a system 5000 via which a final decoding of the ACTMOD takes place to reveal a plain text message from the COMMOD.

FIG. 5 is a block diagram of a system 5000, which illustrates logic employed during the final partial de-code by the actuator module.

Description of the Basic Coding/De-Coding Method

As a first step the basic encryption method will be detailed. A command module ("COMMOD") has pre-stored all addresses of actuator modules in a network. Actuator modules, on the other hand, store the addresses of the command module, and any other pre-determined actuator modules for which there is a need to communicate. There is no "middle man" utilized to store and/or validate the addresses.

For illustration purposes a simple six-digit code will be used for the addresses. In practice the address might include many more alphanumeric characters. For example, "V7439xu298g3". Illustrative addresses are as follows:

CMDMOD: "431289"

ACTMOD: "730019"

A command might be, "activate switch 107" or "close valve A27".

For example purposes, a simple 42 character-index set has been chosen comprising the alphabet, the ten numerical digits and a few commonly used punctuation and symbol characters. In practice a much larger character set, including upper and lower case, would be chosen. The index character conversion table is pre-stored in the memories of each module in the system.

For coding purposes each allowed plain text character is pre-assigned an index number. Ordinarily this index assignment follows the widely used ASCII code standard. For purposes of the teaching exemplary embodiments, however, a simple linear index shown in Table 1 can be employed.

TABLE 1

CHARACTER VALUE TABLE USED BY SENDING AND RECEIVING MODULES

| CHARACTER | VALUE |
| --- | --- |
| A | 1 |
| B | 2 |
| C | 3 |
| D | 4 |
| E | 5 |
| F | 6 |
| G | 7 |
| H | 8 |
| I | 9 |
| J | 10 |
| K | 11 |
| L | 12 |
| M | 13 |
| N | 14 |
| O | 15 |
| P | 16 |
| Q | 17 |
| R | 18 |
| S | 19 |
| T | 20 |
| U | 21 |
| V | 22 |
| W | 23 |
| X | 24 |
| Y | 25 |
| Z | 26 |
| 0 | 27 |
| 1 | 28 |
| 2 | 29 |
| 3 | 30 |
| 4 | 31 |
| 5 | 32 |
| 6 | 33 |
| 7 | 34 |
| 8 | 35 |
| 9 | 36 |
| . ( PERIOD) | 37 |
| , (COMMA) | 38 |
| ? | 39 |
| $ | 40 |
| / | 41 |
| * | 42 |

To maintain full security all encoding and decoding of all activation commands can be performed off-line. In encoding a given command, using the substitution ciphers listed in Table 1 might be broken by a skilled crypto-analyst. Furthermore, crypto-analysts employ frequency analysis to decode high occurrences of characters such as the letter "e", the repeating of coded letter combinations such as "and", "of", or "but," and word spacing. In certain exemplary embodiments, three key features are utilized to overcome such weaknesses. These are:

The addition by both sender and receiver of independently chosen random numbers specific to each character of a plain text substitution cipher. These dual random numbers have a range from "1" to the highest number in the index set. In the example this range is between 1 and 42. The addition of these dual random numbers serves as "one way functions".

The further addition of the cyclical address of the intended receiver to each coded character. By cyclical address it is meant that once the address sequence is exhausted, it is repeated. For example, in a six-character address system, the 7th address character repeats the first value and the 8th address character repeats the second, etc.

In certain exemplary embodiments, the encoded cipher text is converted to binary coded decimal (BCD). The entire message command can be transmitted as one continuous stream of "1's" and "0's". This results in a high degree of "digital entropy." An interceptor sees only a long, uninterrupted, random string of binary bits.

Let us suppose that CMDMOD is constructed to send to a particular ACTMOD that starts with the command "Open".

According to Table 1, the linear plain text substitution character used by both CMDMOD and ACTMOD for the character "O"=15. The command module then adds its own unique machine generated random number between 1 and 42. For example, "8". Lastly, it adds the first digit of ACTMOD's address. In this case, "7".

The index value of the final encoded character then becomes: 15+8+7=30.

The plain text character associated with the index "30" according to Table 1 is the digit "3". This is the character substituted for the original letter. CMDMOD's encoding device would next convert the plain text character "3" to its BCD equivalent using the ASCII standard. In this case the transmitted code is "00000011."

Similarly, The second plain text letter "p" has an associated index of "16." CMDMOD's encoding machine would then add a second newly-generated random number, say 4, plus the second digit of ACTMOD's address that in this case is 3. CMDMOD transmitted plain text character determines a value 16+4+3=23. This is the plain text character "W", which after BCD conversion is transmitted as "00010111".

In the event that the sum of the plain text character value, the random number value, and the cyclic address value exceeds 42, the final encoded value is reduced using 42 as the modulus and encoding the remainder. For example:

$$57 \bmod(42)=15$$

$$89 \bmod(42)=5$$

This is analogous to one or more full backwards rotation of the hands of clock through a multiple of 12 hours.

When the plain text message is completely encoded, CMDMOD first separately stores its series of generated random numbers and the cyclic address values associated with each message character in its encoding device for subsequent de-coding. CMDMOD then transmits the encoded message to ACTMOD. Thus, CMDMOD's Transmitted character=Plain text character index number+random number+ACTMOD's cyclic address. These encoded characters are transmitted in an uninterrupted series of binary coded decimals.

As a second step in the process, ACTMOD takes the received message and character-by-character recodes CMD-MOD's encoded command using the common plain text character set. To this index, ACTMOD then adds its own unique random generated number, together with the cyclic address of CMDMOD. Thus, for each character in the received message, from CMDMOD:

ACTMOD's recode=Index value for each received character+ACTMOD's random generated number+cyclic address of CMDMOD. ACTMOD stores its randomly generated number for each character along with CMDMOD's cyclic address value before re-transmitting its newly recoded message back to CMDMOD.

In the second step of the message transmission, mutual decoding begins to take place. CMDMOD first takes ACT-MOD's transmitted recode and subtracts out character-by-character, its previously stored random numbers and its own cyclic address. CMDMOD then transmits it back to ACT- MOD for a third and final time Thus, CMDMOD's third transmission=(ACTMOD's received code)–(CMDMOD's stored random number for each character in the sequence)–(CMDMOD's cyclic address).

As the final step of the process, ACTMOD takes CMD-MOD's partially de-coded message and uncovers the original plain-text message by subtracting out, character by character, its own series of stored random numbers and its own cyclic address. Thus, ACTMOD's Plain text message recovery=(CMDMOD's partly decoded transmission)–(ACTMOD's pre-stored random number for each character)–(ACTMOD's cyclic address).

ACTMOD's Plain text message recovery=(CMD-MOD''s partly decoded transmission)–(ACT-MOD's pre-stored random number for each character)–(ACTMOD's cyclic address)

Table 2 summarizes the back and forth transmissions between a command module and a selected actuator.

TABLE 2

| | Summary of code transactions between a command module and an actuator module. | |
|---|---|---|
| | ACTION | CODE SUM |
| 0 | CMDMOD LOOKS UP INDEX (A) OF CHARACTER TO BE TRANSMITTED , "X" | A |
| 1 | CMDMOD ADDS CYCLIC ADDRESS (B) OF ACTMOD AND A RANDOM NUMBER (C) | $(A + B + C)$ |
| 2 | ACTMOD RECODES RECEIVED CMD CODE BY ADDING CYCLIC ADDRESS (D) OF CMD MODULE AND A $2^{ND}$ RANDOM NMBR (E) | $(A + B + C) + (D + E)$ |
| 3 | CMDMOD PERFORMS PARTIAL DECODING BY SUBTRACTING CMDMOD CYCLIC ADDRESS (D) AND RANDOM NUMBER (C) | $(A + B + C + D + E) - (C + D) = (A + B + E))$ |
| 4 | ACTMOD RECOVERS (A ) BY SUBTRACTING OUT ITS OWN CYCLIC ADDRESS AND STORED RND NUMBER. | $(A + B + E) - (B + E)=A.$ INDEX (A) = "X" |

Table 3 shows how an encrypted command from CMD-MOD to ACTMOD would appear during each stage of the transmission process. ("OPEN VALVE 127").

TABLE 3

| | Illustrates how the coding appears during the three exposed stages of the transmission process. | | | | | | | | | | | |
|---|---|---|---|---|---|---|---|---|---|---|---|---|
| COMMOD PLAIN TEXT MSG | O | P | E | N | * | V | A | L | V | E | * | 1 | 2 | 7 |
| COMMOD'S TRANSMITTED CODE | M | 3 | 2 | Z | * | A | O | X | , | V | 3 | D | M | , |
| ACTMOD'S RECODE OF RECEIVED MSG | / | X | 1 | ? | I | 1 | V | H | 5 | . | K | $ | 8 | 7 |
| COMMOD'S PARTIAL DECODE | * | I | C | Z | H | F | G | . | $ | S | V | U | H | 2 |
| ACTMOD'S FINAL DECODE | O | P | E | N | * | V | A | L | V | E | * | 1 | 2 | 7 |

Table 4 shows how the dual random coding appears during the three-stage transmission process of a string of "A"s. This figure illustrates the dynamic character-by-character random coding of the subject invention throughout the entire transmission process.

TABLE 4

| Illustrating the random dynamic nature of the character-by-character coding throughout the transmission process. | | | | | | | | | | | |
|---|---|---|---|---|---|---|---|---|---|---|---|
| COMMOD PLAIN TEXT MSG | A | A | A | A | A | A | A | A | A | A | A | A |
| COMMOD'S TRANSMITTED CODE | E | L | M | L | A | * | 0 | 6 | * | V | . | 3 |
| ACTMOD'S RECODE OF RECEIVED MSG | $ | A | T | P | F | O | B | Q | , | R | G | A |
| COMMOD'S PARTIAL DECODE | 8 | 4 | G | D | L | O | Q | Z | , | , | L | M |
| ACTMOD'S FINAL DECODE | A | A | A | A | A | A | A | A | A | A | A | A |

Table 5 illustrates how frequently used words such as "AND" are undiscoverable by intercepting the code and searching for word frequency. It will also be noted that word length spacing in the foregoing examples is completely obscured during the transmission process.

TABLE 5

| Illustrating the random coding of the frequently used word, "AND", it can be noted word length and spacing are obscured during the transmission process. | | | | | | | | | | |
|---|---|---|---|---|---|---|---|---|---|---|
| COMMOD PLAIN TEXT MSG | A | N | D | * | A | N | D | * | A | N | D |
| COMMOD'S TRANSMITTED CODE | O | V | Z | G | Y | X | 1 | 1 | Y | D | G |
| ACTMOD'S RECODE OF RECEIVED MSG | 9 | X | 2 | 8 | O | 2 | B | 8 | N | 3 | 6 |
| COMMOD'S PARTIAL DECODE | U | O | F | 0 | 5 | R | S | F | 4 | ? | 2 |
| ACTMOD'S FINAL DECODE | A | N | D | * | A | N | D | * | A | N | D |

Tables 6A & 6B illustrate how the same message, "CLOSE SWITCH AD3", would appear during the transmission process, when immediately repeated. An interceptor who was privy to the entire encoding-decoding process of a given plain text message would find this information useless in the interception of subsequent messages.

TABLE 6-A

| First transmission of the message, "CLOSE SWITCH AD3" | | | | | | | | | | | | | | |
|---|---|---|---|---|---|---|---|---|---|---|---|---|---|---|
| COMMOD PLAIN TEXT MSG | C | L | O | S | E | * | S | W | I | T | C | H | * | A | D | 3 |
| COMMOD'S TRANSMITTED CODE | V | 7 | M | U | L | 4 | W | N | L | Y | J | G | X | 9 | 5 | C |
| ACTMOD'S RECODE OF RECEIVED MSG | Z | 3 | Y | M | G | 9 | 3 | F | N | E | 4 | . | X | D | U | G |
| COMMOD'S PARTIAL DECODE | F | G | Z | J | / | D | Y | N | J | / | W | . | / | J | 7 | 6 |
| ACTMOD'S FINAL DECODE | C | L | O | S | E | * | S | W | I | T | C | H | * | A | D | 3 |

TABLE 6-B

| immediate re-transmission of the identical message, "CLOSE SWITCH AD3". | | | | | | | | | | | | | | |
|---|---|---|---|---|---|---|---|---|---|---|---|---|---|---|
| COMMOD PLAIN TEXT MSG | C | L | O | S | E | * | S | W | I | T | C | H | * | A | D | 3 |
| COMMOD'S TRANSMITTED CODE | 3 | B | E | P | T | J | P | T | $ | M | K | U | J | 8 | 6 | Q |
| ACTMOD'S RECODE OF RECEIVED MSG | S | . | , | K | T | V | M | O | E | K | J | M | / | D | Z | G |
| COMMOD'S PARTIAL DECODE | 6 | D | E | M | D | K | O | Q | O | Q | A | / | 3 | K | , | S |
| ACTMOD'S FINAL DECODE | C | L | O | S | E | * | S | W | I | T | C | H | * | A | D | 3 |

Description of a Typical Hardware Implementation of a Command Module (COMMOD) and an Actuator Module (ACTMOD).

FIG. 1, shows a system overview of typical hardware elements comprising a command module ("COMMOD") and an actuator module ("ACTMOD"). In certain exemplary embodiments, a multiplicity of actuator modules can be under the control of a command module. Control commands are inputted using an input/output device 1. The keyboard code is inputted to a memory storage bank 9 that can be segmented into four blocks. Data from the keyboard is fed in parallel to a BCD character conversion table 10. Addresses are stored in a sender/receiver valid address book 12. Message lengths are stored in a message length store 13. Input/output device 1 additionally controls a random number generation, which provides an output for each coded character. Successive random number generator outputs are stored in random number sequence store 11.

As each character is inputted from input/output device 1, the binary coded outputs of the BCD character conversion table 10, the repeating address of the intended receiver, and the associated random number sequence are summed in a binary adder that incorporates the aforementioned modular correction of this sum.

The summed output of a binary adder is next fed to a message format assembler. A message start ("SOM") and end-of-message ("EOM") bracket generator also feeds the message format assembler.

Ordinarily communication between sender and receiver over the Internet can be accomplished by the use of passwords or other standard authorization protocols. In the case of wireless transmissions, however, there is a need to guarantee that only the intended receiver will respond to the sender and detect the message. Moreover, if there are many legitimate actuator modules on a network only the intended receiver should respond. One way to accomplishes this is as follows:

The command and actuator modules incorporate a message-alert identification header that is an unencoded mathematical sum of the sender address and the intended receiver address at the start of each recode or decode transmission. This binary sum is packaged by a (9) message format assembler by a series of brackets that serve as a "wake-up" call before and after the address sum. Thus, in the example case of CMDMOD (432189), and ACTMOD (730019), the sender would first transmit the following alert "header" in BCD format:

<<<<<1,161308>>>>>

The intent of the brackets (< >) is to automatically alert all actuator devices that there is an incoming message. The receiving devices first subtracts out their own address from the header sum and then check to see if the remainder identifies a valid command module address which has been encrypted and pre-stored in a memory device on each activating device. This summed address header serves as an a simple "one way function", which cannot be decomposed without a legitimate receiver address. If a valid sender address is confirmed the process of re-coding and de-coding between the command module and the intended actuator proceeds. If a legitimate sender address is not detected, no response is given by the receiver. This all serves as a "handshaking" function in a secure communication. It should further be noted that in a network where there are a large number of legitimate activation modules. The message-alert identification header prevents unintended receivers from nuisance responding to incoming messages.

After packaging by the message format assembler, the encoded message is sent to a transmit/receive module and a message validation checker. The purpose of this checker is to make sure that responses received during the back and forth transmission processes arrive in a timely matter and are from a legitimate sender.

When in the receive mode the command or actuator module the message is first tested by a message validation checker before re-coding or de-coding. The received transmission is checked for:

properly formatted message alert "header";

timely response to a sent message;

valid address of the sender, and correct message length.

Figure 6:
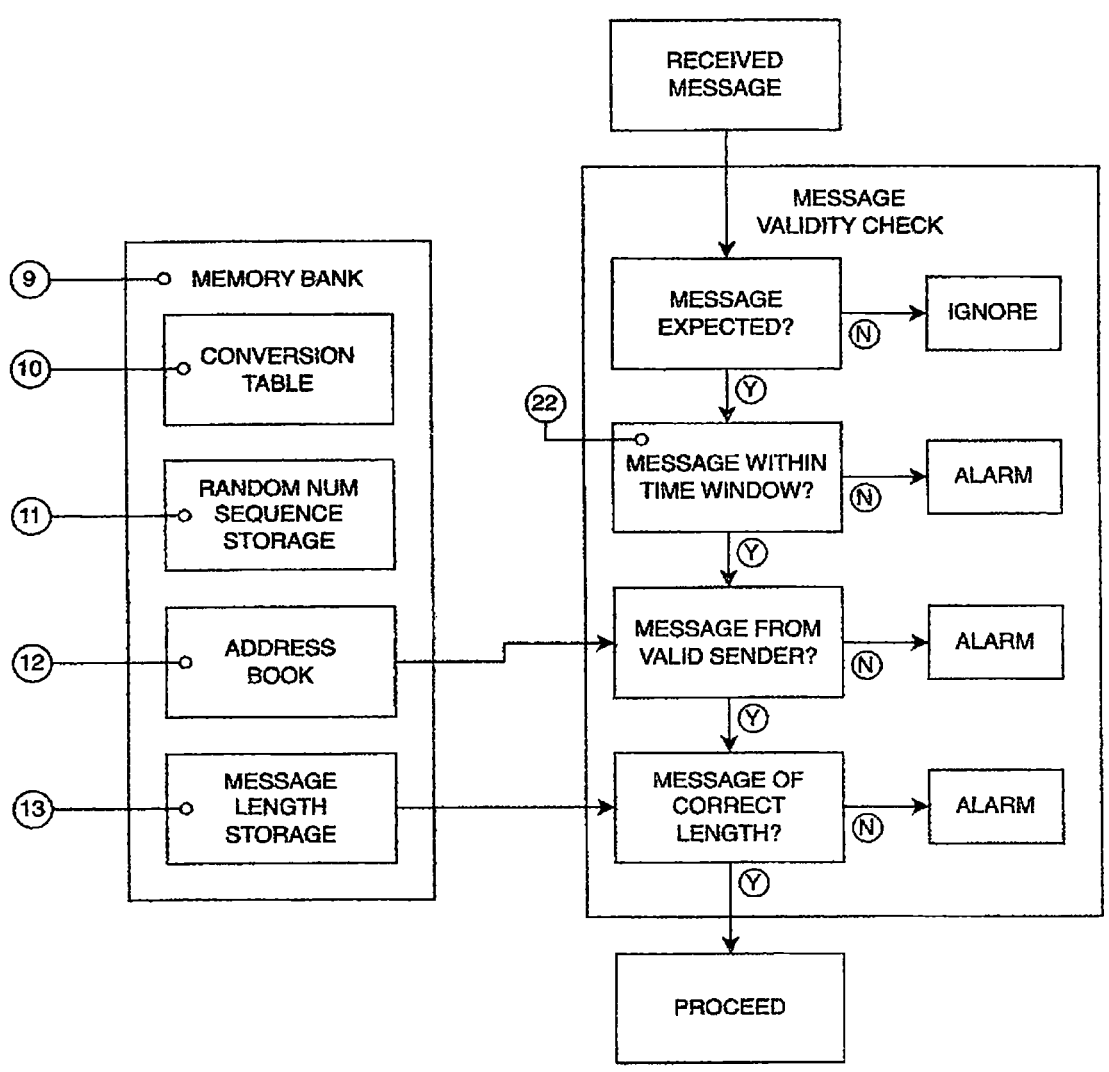
FIG. 6 is a block diagram 6000 of logic employed for checking message Validity.
Figure 7:
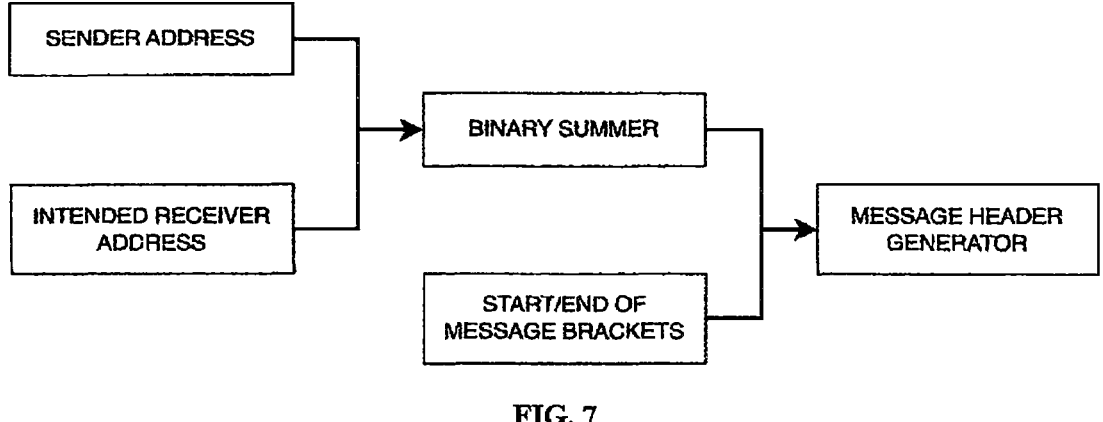
FIG. 7 is a flowchart of an exemplary embodiment of a method for message header generation.

FIG. 6 illustrates sequential logic used for message validation.

As shown in FIG. 1, each actuator module, (ACTMOD) employs the same general hardware and logic as a command module with the following exceptions:

there is no keyboard/display unit, and the address bank only holds its own address, the associated command module, and other network actuator modules, which are allowed for that actuator.

Transmission of Digital Signatures and Other ID Validation Numbers

In legal and financial transactions transmitted via the Internet or wireless means there is a need for a valid "digital signature" method. Credit card numbers, social security numbers, electronic voting and medical insurance ID's also require highly secure means to prevent unauthorized use. Currently this is accomplished via a trusted "middle-man server," where sender and receiver identities are pre-stored. From the forgoing analysis of the coding system previously described, it is easily seen that the described coding system accomplishes this without the need of an intermediate server. The document signer simply types out in plain text his or her signature and transmits the resultant encoded message to the intended recipient. The recipient next recodes the received message and sends it back to the document signer. The document signer now partially decodes this second received message, and re-transmits it back to the intended receiver, who decodes it to reveal the digital signature. This is illustrated in Table 10. It will be understood by those skilled in the art that implementation of this digital signature verification can easily be accomplished using a pre-stored "app" on an I-phone, I-pad or other commonly available communication or computer devices.

TABLE 7

| ILLUSTRATING SECURE CREDIT CARD TRANSMISSSION | | | | | | | | | | | | | | | | | | | |
|---|---|---|---|---|---|---|---|---|---|---|---|---|---|---|---|---|---|---|---|
| CUSTOMER'S CREDIT CARD NUMBER | 1 | 2 | 3 | 4 | * | 5 | 6 | 7 | 8 | * | 9 | 0 | 1 | 2 | * | 3 | 4 | 5 | 6 |
| CUSTOMER'S ENCODED TRANSMISSION | G | I | L | E | 8 | Y | Y | L | S | F | O | 1 | , | G | V | Z | . | Z | U |
| VENDOR'S RECODE & TRANSMISSION | R | . | , | K | Y | Q | J | * | F | 7 | I | P | 8 | * | G | K | / | W | T |
| CUSTOMER'S PARTIAL DECODE & TRANSMISSION | , | N | M | 9 | 4 | W | Q | U | * | 0 | 2 | N | X | U | J | N | 7 | 1 | 4 |
| VENDOR'S FINAL DECODE | 1 | 2 | 3 | 4 | | 5 | 6 | 7 | 8 | | 9 | 0 | 1 | 2 | | 3 | 4 | 5 | 6 |

FIG. 4 is a block diagram of an exemplary embodiment of an information device 4000, which in certain operative embodiments can comprise, for example, server 1200, user information device 1400, [ ] of FIG. 1. Information device 4000 can comprise any of numerous circuits and/or components, such as for example, one or more network interfaces 4100, one or more processors 4200, one or more memories 7300 containing instructions 7400, one or more input/output (I/O) devices 7500, and/or one or more user interfaces 7600 coupled to I/O device 7500, etc.

In certain exemplary embodiments, via one or more user interfaces 2600, such as a graphical user interface, a user can view a rendering of information related to researching, designing, modeling, creating, developing, building, manufacturing, operating, maintaining, storing, marketing, selling, delivering, selecting, specifying, requesting, ordering, receiving, returning, rating, and/or recommending any of the products, services, methods, and/or information described herein.

Definitions

When the following terms are used substantively herein, the accompanying definitions apply. These terms and definitions are presented without prejudice, and, consistent with the application, the right to redefine these terms during the prosecution of this application or any application claiming priority hereto is reserved. For the purpose of interpreting a claim of any patent that claims priority hereto, each definition (or redefined term if an original definition was amended during the prosecution of that patent), functions as a clear and unambiguous disavowal of the subject matter outside of that definition.

a—at least one.

activity—an action, act, step, and/or process or portion thereof.

actuator module—hardware and/or software constructed to communicate with and accept control signals from one or more control modules.

adapted to—made suitable or fit for a specific use or situation.

add—to determine a mathematical sum of quantities.

admit—to allow participation in communications.

address—a name or number used for identification in information storage or retrieval that are assignable to a specific machine or component.

alarm—a warning of existing or approaching danger.

alert—an electrical or electronic signal that serves to indicate a that a something of concern has been detected.

allow—to position so as to facilitate an action.

and/or—either in conjunction with or in alternative to.

apparatus—an appliance or device for a particular purpose.

application—machine instructions constructed to carry out a useful task.

associate—to join, connect together, and/or relate.

automatically—acting or operating in a manner essentially independent of external influence or control. For example, an automatic light switch can turn on upon "seeing" a person in its view, without the person manually operating the light switch.

between—in common to.

binary coded decimal—a class of binary encodings of decimal numbers where each digit is represented by a fixed number of bits.

can—is capable of, in at least some embodiments.

cause—to produce an effect.

character—a graphic symbol (such as an alphabet letter) used in writing.

circuit—an electrically conductive pathway and/or a communications connection established across two or more switching devices comprised by a network and between corresponding end systems connected to, but not comprised by the network.

code—(n) a system of symbols (e.g., letters and/or numbers) used to represent assigned and/or secret meanings; (v) to put into the form or symbols of a code.

codebook—a document used for implementing a code that comprises a lookup table for coding and decoding; each word or phrase has one or more strings that replace the word or phrase.

command module—hardware and/or software constructed to communicate with and control one or more actuator modules.

common—same.

communicatively couple—to link in a manner that facilitates communications.

comprising—including but not limited to.

configure—to make suitable or fit for a specific use or situation.

constructed to—made to and/or designed to.

control—(v) to direct one or more activities.

convert—to transform, adapt, and/or change.

couple—to join in some fashion.

coupleable—capable of being joined, connected, and/or linked together.

coupled—connected or electronically linked.

create—to bring into being.

cyclically—recurring regularly.

data—distinct pieces of information, usually formatted in a special or predetermined way and/or organized to express concepts.

decode—to convert data by reversing the effect of previous encoding, and/or to interpret a code.

define—to establish the outline, form, or structure of.

detect—to sense or perceive.

determine—to obtain, calculate, decide, deduce, and/or ascertain.

device—a machine, manufacture, and/or collection thereof.

digital—non-analog; discrete.

digital summer—hardware and/or software that adds or subtracts something from a message.

distribute—to pass out to a set of receivers.

encode—to convert data by the use of a code, frequently one consisting of binary numbers, in such a manner that reconversion to the original form is possible. Alternatively, to append redundant check symbols to a message for the purpose of generating an error detection and/or correction code.

encrypt—to convert data into a cipher or code to prevent unauthorized access.

event—something that has happened.

final—last in a series.

generate—to create, produce, give rise to, and/or bring into existence.

haptic—involving the human sense of kinesthetic movement and/or the human sense of touch. Among the many potential haptic experiences are numerous sensations, body-positional differences in sensations, and time-based changes in sensations that are perceived at least partially in non-visual, non-audible, and non-olfactory manners, including the experiences of tactile touch (being touched), active touch, grasping, pressure, friction, traction, slip, stretch, force, torque, impact, puncture, vibration, motion, acceleration, jerk, pulse, orientation, limb position, gravity, texture, gap, recess, viscosity, pain, itch, moisture, temperature, thermal conductivity, and thermal capacity.

header—introductory characters in a message.

identity—what a thing is.

independent—not relying on, or related to, something else.

index—something that serves to guide, point out, or otherwise facilitate reference.

information device—any device capable of processing data and/or information, such as any general purpose and/or special purpose computer, such as a personal computer, workstation, server, minicomputer, mainframe, supercomputer, computer terminal, laptop, wearable computer, and/or Personal Digital Assistant (PDA), mobile terminal, Bluetooth device, communicator, "smart" phone (such as a Treo-like device), messaging service (e.g., Blackberry) receiver, pager, facsimile, cellular telephone, a traditional telephone, telephonic device, a programmed microprocessor or microcontroller and/or peripheral integrated circuit elements, an ASIC or other integrated circuit, a hardware electronic logic circuit such as a discrete element circuit, and/or a programmable logic device such as a PLD, PLA, FPGA, or PAL, or the like, etc. In general any device on which resides a finite state machine capable of implementing at least a portion of a method, structure, and/or or graphical user interface described herein may be used as an information device. An information device can comprise components such as one or more network interfaces, one or more processors, one or more memories containing instructions, and/or one or more input/output (I/O) devices, one or more user interfaces coupled to an I/O device, etc.

initialize—to prepare something for use and/or some future event.

input/output (I/O) device—any sensory-oriented input and/or output device, such as an audio, visual, haptic, olfactory, and/or taste-oriented device, including, for example, a monitor, display, projector, overhead display, keyboard, keypad, mouse, trackball, joystick, gamepad, wheel, touchpad, touch panel, pointing device, microphone, speaker, video camera, camera, scanner, printer, haptic device, vibrator, tactile simulator, and/or tactile pad, potentially including a port to which an I/O device can be attached or connected.

integral—formed as a monolithic whole.

invalid—not legitimate, as a message.

length—a longest extent of something as measured from end to end.

machine instructions—directions adapted to cause a machine, such as an information device, to perform one or more particular activities, operations, or functions. The directions, which can sometimes form an entity called a "processor", "kernel", "operating system", "program", "application", "utility", "subroutine", "script", "macro", "file", "project", "module", "library", "class", and/or "object", etc., can be embodied as machine code, source code, object code, compiled code, assembled code, interpretable code, and/or executable code, etc., in hardware, firmware, and/or software.

machine readable medium—a physical structure from which a machine can obtain data and/or information. Examples include a memory, punch cards, etc.

may—is allowed and/or permitted to, in at least some embodiments.

memory device—an apparatus capable of storing analog or digital information, such as instructions and/or data. Examples include a non-volatile memory, volatile memory, Random Access Memory, RAM, Read Only Memory, ROM, flash memory, magnetic media, a hard disk, a floppy disk, a magnetic tape, an optical media, an optical disk, a compact disk, a CD, a digital versatile disk, a DVD, and/or a raid array, etc. The memory device can be coupled to a processor and/or can store instructions adapted to be executed by processor, such as according to an embodiment disclosed herein.

message—a communication.

method—a process, procedure, and/or collection of related activities for accomplishing something.

network—a communicatively coupled plurality of nodes. A network can be and/or utilize any of a wide variety of sub-networks, such as a circuit switched, public-switched, packet switched, data, telephone, telecommunications, video distribution, cable, terrestrial, broadcast, satellite, broadband, corporate, global, national, regional, wide area, backbone, packet-switched TCP/IP, Fast Ethernet, Token Ring, public Internet, private, ATM, multi-domain, and/or multi-zone sub-network, one or more Internet service providers, and/or one or more information devices, such as a switch, router, and/or gateway not directly connected to a local area network, etc.

network interface—any device, system, or subsystem capable of coupling an information device to a network. For example, a network interface can be a telephone, cellular phone, cellular modem, telephone data modem, fax modem, wireless transceiver, Ethernet card, cable modem, digital subscriber line interface, bridge, hub, router, or other similar device.

number—a unit belonging to an abstract mathematical system and subject to specified laws of succession, addition, and multiplication.

obscure—to conceal.

part—a portion of something.

partially—to a limited extent.

plain text—organized alphanumeric readable text before it is encrypted, or readable text after it is decrypted.

plurality—the state of being plural and/or more than one.

portion—a part of a whole.

pre-arranged de-coding algorithm—a secret and agreed method for uncovering a coded message pre-transmitted—sent before transmission of a message to be encrypted and decrypted.

predetermined—established in advance.

pre-stored—stored at a time prior to receiving a message to be encoded.

private key—an alphanumeric code that is used with an algorithm to encrypt and decrypt data.

probability—a quantitative representation of a likelihood of an occurrence.

processor—a device and/or set of machine-readable instructions for performing one or more predetermined tasks. A processor can comprise any one or a combination of hardware, firmware, and/or software. A processor can utilize mechanical, pneumatic, hydraulic, electrical, magnetic, optical, informational, chemical, and/or biological principles, signals, and/or inputs to perform the task(s). In certain embodiments, a processor can act upon information by manipulating, analyzing, modifying, converting, transmitting the information for use by an executable procedure and/or an information device, and/or routing the information to an output device. A processor can function as a central processing unit, local controller, remote controller, parallel controller, and/or distributed controller, etc. Unless stated otherwise, the processor can be a general-purpose device, such as a microcontroller and/or a microprocessor, such the Pentium IV series of microprocessor manufactured by the Intel Corporation of Santa Clara, California. In certain embodiments, the processor can be dedicated purpose device, such as an Application Specific Integrated Circuit (ASIC) or a Field Programmable Gate Array (FPGA) that has been designed to implement in its hardware and/or firmware at least a part of an embodiment disclosed herein.

project—to calculate, estimate, or predict.

provide—to furnish, supply, give, and/or make available.

random number—a number generated using a large set of numbers and a mathematical algorithm which gives equal probability to all numbers occurring in the large set of numbers.

receive—to get as a signal, take, acquire, and/or obtain.

receiver—a device constructed to access and accept signals.

recode—to code again.

recommend—to suggest, praise, commend, and/or endorse.

remove—to take something away.

render—to make perceptible to a human, for example as data, commands, text, graphics, audio, video, animation, and/or hyperlinks, etc., such as via any visual, audio, and/or haptic means, such as via a display, monitor, electric paper, ocular implant, cochlear implant, speaker, etc.

repeatedly—again and again; repetitively.

request—to express a desire for and/or ask for.

respond—to do something as a reaction to something that has happened.

result—an outcome of something.

reveal—to decode or expose.

select—to make a choice or selection from alternatives.

send—to transmit as a signal.

sender—a device constructed to transmit signals.

set—a related plurality.

share—to store the same information.

signal—information, such as machine instructions for activities and/or one or more letters, words, characters, symbols, signal flags, visual displays, and/or special sounds, etc. having prearranged meaning, encoded as automatically detectable variations in a physical variable, such as a pneumatic, hydraulic, acoustic, fluidic, mechanical, electrical, magnetic, optical, chemical, and/or biological variable, such as power, energy, pressure, flowrate, viscosity, density, torque, impact, force, frequency, phase, voltage, current, resistance, magnetomotive force, magnetic field intensity, magnetic field flux, magnetic flux density, reluctance, permeability, index of refraction, optical wavelength, polarization, reflectance, transmittance, phase shift, concentration, and/or temperature, etc. Depending on the context, a signal and/or the information encoded therein can be synchronous, asynchronous, hard real-time, soft real-time, non-real time, continuously generated, continuously varying, analog, discretely generated, discretely varying, quantized, digital, broadcast, multicast, unicast, transmitted, conveyed, received, continuously measured, discretely measured, processed; encoded, encrypted, multiplexed, modulated, spread, de-spread, demodulated, detected, de-multiplexed, decrypted, and/or decoded, etc.

store—to place, hold, and/or retain data, typically in a memory.

substantially—to a great extent or degree.

subtract—to determine a mathematical difference between two quantities.

sum—(n) a result of adding two or more numbers; (v) to add.

system—a collection of mechanisms, devices, machines, articles of manufacture, processes, data, and/or instructions, the collection designed to perform one or more specific functions.

test—to evaluate.

transmit—to send as a signal, provide, furnish, and/or supply.

unencoded—lacking encryption.

user interface—any device for rendering information to a user and/or requesting information from the user. A user interface includes at least one of textual, graphical, audio, video, animation, and/or haptic elements. A textual element can be provided, for example, by a printer, monitor, display, projector, etc. A graphical element can be provided, for example, via a monitor, display, projector, and/or visual indication device, such as a light, flag, beacon, etc. An audio element can be provided, for example, via a speaker, microphone, and/or other sound generating and/or receiving device. A video element or animation element can be provided, for example, via a monitor, display, projector, and/or other visual device. A haptic element can be provided, for example, via a very low frequency speaker, vibrator, tactile stimulator, tactile pad, simulator, keyboard, keypad, mouse, trackball, joystick, gamepad, wheel, touchpad, touch panel, pointing device, and/or other haptic device, etc. A user interface can include one or more textual elements such as, for example, one or more letters, number, symbols, etc. A user interface can include one or more graphical elements such as, for example, an image, photograph, drawing, icon, window, title bar, panel, sheet, tab, drawer, matrix, table, form, calendar, outline view, frame, dialog box, static text, text box, list, pick list, pop-up list, pull-down list, menu, tool bar, dock, check box, radio button, hyperlink, browser, button, control, palette, preview panel, color wheel, dial, slider, scroll bar, cursor, status bar, stepper, and/or progress indicator, etc. A textual and/or graphical element can be used for selecting, programming, adjusting, changing, specifying, etc. an appearance, background color, background style, border style, border thickness, foreground color, font, font style, font size, alignment, line spacing, indent, maximum data length, validation, query, cursor type, pointer type, autosizing, position, and/or dimension, etc. A user interface can include one or more audio elements such as, for example, a volume control, pitch control, speed control, voice selector, and/or one or more elements for controlling audio play, speed, pause, fast forward, reverse, etc. A user interface can include one or more video elements such as, for example, elements controlling video play, speed, pause, fast forward, reverse, zoom-in, zoom-out, rotate, and/or tilt, etc. A user interface can include one or more animation elements such as, for example, elements controlling animation play, pause, fast forward, reverse, zoom-in, zoom-out, rotate, tilt, color, intensity, speed, frequency, appearance, etc. A user interface can include one or more haptic elements such as, for example, elements utilizing tactile stimulus, force, pressure, vibration, motion, displacement, temperature, etc.

utilize—to put to use.

valid—legitimate, as a message.

validation checker—hardware and/or software constructed to determine a legitimate character of a message.

vary—to differ and/or change from an original state.

via—by way of and/or utilizing.

weight—a value indicative of importance.

Note

Still other substantially and specifically practical and useful embodiments will become readily apparent to those skilled in this art from reading the above-recited and/or herein-included detailed description and/or drawings of certain exemplary embodiments. It should be understood that numerous variations, modifications, and additional embodiments are possible, and accordingly, all such variations, modifications, and embodiments are to be regarded as being within the scope of this application.

Thus, regardless of the content of any portion (e.g., title, field, background, summary, description, abstract, drawing figure, etc.) of this application, unless clearly specified to the contrary, such as via explicit definition, assertion, or argument, with respect to any claim, whether of this application and/or any claim of any application claiming priority hereto, and whether originally presented or otherwise:

there is no requirement for the inclusion of any particular described or illustrated characteristic, function, activity, or element, any particular sequence of activities, or any particular interrelationship of elements;

no characteristic, function, activity, or element is "essential";

any elements can be integrated, segregated, and/or duplicated;

any activity can be repeated, any activity can be performed by multiple entities, and/or any activity can be performed in multiple jurisdictions; and any activity or element can be specifically excluded, the sequence of activities can vary, and/or the interrelationship of elements can vary.

Moreover, when any number or range is described herein, unless clearly stated otherwise, that number or range is approximate. When any range is described herein, unless clearly stated otherwise, that range includes all values therein and all subranges therein. For example, if a range of 1 to 10 is described, that range includes all values therebetween, such as for example, 1.1, 2.5, 3.335, 5, 6.179, 8.9999, etc., and includes all subranges therebetween, such as for example, 1 to 3.65, 2.8 to 8.14, 1.93 to 9, etc.

When any claim element is followed by a drawing element number, that drawing element number is exemplary and non-limiting on claim scope. No claim of this application is intended to invoke paragraph six of 35 USC 112 unless the precise phrase "means for" is followed by a gerund.

Any information in any material (e.g., a United States patent, United States patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such material is specifically not incorporated by reference herein.

Accordingly, every portion (e.g., title, field, background, summary, description, abstract, drawing figure, etc.) of this application, other than the claims themselves, is to be regarded as illustrative in nature, and not as restrictive, and the scope of subject matter protected by any patent that issues based on this application is defined only by the claims of that patent.

What is claimed is:

1. A system comprising:

a command module, the command module constructed to encode a plain text message, wherein each character of the plain text message is first encoded utilizing a sum of a digitally pre-stored plain text index code and a first independently randomly generated number to form a coded message, the first independently randomly generated number stored via the command module, the digitally pre-stored plain text index code shared between a sender and a receiver; wherein the coded message is first transmitted by the sender to the receiver;

an actuator module, the actuator module constructed to be utilized by the receiver to re-code the coded message, character by character, utilizing a second independently generated number to form a re-coded message, the second independently generated number stored via the actuator module; wherein the receiver transmits the re-coded message back to the sender; wherein the sender partially decodes the re-coded message via digitally subtracting out the first independently randomly generated number to form a partially decoded message; wherein the partially decoded message is transmitted back to the receiver; and wherein the partially decoded message undergoes final decoding by the receiver by digitally subtracting out, character by character, the second independently generated number to reveal the plain text message.

2. The system of claim 1, wherein: wherein the system does not utilize any shared codebook or pre-arranged decoding algorithm.

3. The system of claim 1, wherein: the system does not distribute a private key.

4. The system of claim 1, wherein:

an address of the receiver is a cyclically varying address, the cyclically varying address further added to the plain text message and associated randomly generated number, character by character, by the sender before transmitting the coded message to the intended receiver;

wherein the receiver further adds the cyclically varying address of the sender in forming the re-coded message before transmitting the re-coded message back to the sender;

wherein the sender performs a partial decode by removing the cyclically varying address of the sender along with the first independently randomly generated number and transmits the partially decoded message back to the receiver; and wherein the receiver reveals the plain text message by removing, character by character, from the partially decoded message the cyclically varying address of the receiver and the second independently generated number.

5. The system of claim 1, further comprising:

a validation checker, the validation checker constructed to:

receive an alert concerning an incoming message, responsive to the alert, the validation checker constructed to test an address of the sender of the incoming message for validity;

test a length of the incoming message for validity; and transmit an alarm in event of a detection of an invalid message.

6. The system of claim 1, further comprising:

in both the command module and the actuator module:

a random number generator, the random number generator constructed to provide independently generated numbers, wherein the random number generator constructed to generate continually varying random numbers;

a first memory device, the first memory device constructed to store valid encrypted addresses of the sender and the receiver and other sending and receiving information devices admitted to a network, the sender and the receiver communicatively coupled via the network;

a second memory device, the second memory device constructed to store a common numerical index for each allowed plain-text character;

a third memory device, the third memory device constructed to store the first independently generated number and the second independently generated number;

a fourth memory device, the fourth memory device constructed to store coded message lengths;

a digital summer, the digital summer to form a binary coded decimal result of adding or subtracting to a plain character index, a random number and a cyclical address of the receiver, character by character;

a validation checker, the validation checker constructed to:

receive an alert concerning an incoming message, responsive to the alert, the validation checker constructed to test an address of the sender of the incoming message for validity; test a length of the incoming message for validity; and transmit an alarm in event of a detection of an invalid message.

7. The system of claim 1, further comprising:

a message header and alert processor, the message header and alert processor that is constructed to determine an unencoded sum of addresses of the sender and the receiver, wherein the receiver detects an address of the sender and tests for validity before responding.

8. The system of claim 1, wherein:

an address of the sender and an address of the receiver is an integral but obscured part of each character of the coded message; and wherein the coded message is decodable only by the receiver.

9. The system of claim 1, wherein:

the receiver utilizes a requested signature or identity code using an application that is pre-transmitted and stored on an information device.

\* \* \* \* \*